(12) United States Patent
Revol et al.

(10) Patent No.: US 9,798,013 B2
(45) Date of Patent: Oct. 24, 2017

(54) METHOD OF DETECTING INTERFERENCE IN A SATELLITE RADIO-NAVIGATION SIGNAL

(71) Applicant: THALES, Neuilly-sur-seine (FR)

(72) Inventors: Marc Revol, Upie (FR); David Pietin, Le Haillan (FR)

(73) Assignee: Thales, Courbevoie (FR)

( * ) Notice: Subject to any disclaimer, the term of this patent is extended or adjusted under 35 U.S.C. 154(b) by 459 days.

(21) Appl. No.: 14/526,414

(22) Filed: Oct. 28, 2014

(65) Prior Publication Data

US 2015/0116149 A1    Apr. 30, 2015

(30) Foreign Application Priority Data

Oct. 31, 2013  (FR) .................................... 13 02523

(51) Int. Cl.
*G01S 19/21*    (2010.01)
*G01S 19/22*    (2010.01)
(Continued)

(52) U.S. Cl.
CPC .............. *G01S 19/21* (2013.01); *G01S 19/22* (2013.01); *H04B 1/7097* (2013.01); *H04B 1/711* (2013.01)

(58) Field of Classification Search
CPC ........ G01S 19/21; G01S 19/22; G01S 19/215; H04B 1/7075; H04B 1/7097; H04B 1/711
(Continued)

(56) References Cited

U.S. PATENT DOCUMENTS 7,295,635 B2* 11/2007 Coatantiec ........... H04B 1/7085
                                                    375/144
7,876,807 B2*  1/2011 Ray ......................... G01S 19/22
                                                    375/136
(Continued)

FOREIGN PATENT DOCUMENTS

JP   2013 181803 A    9/2013
WO   2004031797 A1    4/2004
WO   2009158049 A1   12/2009

OTHER PUBLICATIONS

Institute National De La Propriete Industrielle: French Search Report; dated Jul. 8, 2014; Courbevoie, France.

*Primary Examiner* — Chuong P Nguyen
(74) *Attorney, Agent, or Firm* — Davis Wright Tremaine LLP; Michael J. Donohue

(57) ABSTRACT

Method of detecting interference in a satellite radio-navigation signal, characterized in that it comprises the following steps:
  determining a first temporal position for which the correlation between the said signal and a local spreading code, offset by the said position, is maximum;
  determining a plurality of measurements of correlation between the said signal and a local spreading code offset by a plurality of secondary temporal positions, the said plurality of secondary temporal positions and the said first temporal position being regularly spaced;
  determining, for a plurality of correlation measurement pairs formed by two measurements at two consecutive temporal positions, the phase difference between the two correlation measurements of the said pair;
  calculating an item of information representative of the standard deviation of the said phase difference; and
(Continued)

comparing the said item of information with a detection threshold configured at least as a function of the ratio of the powers of the signal and of the interference.

11 Claims, 2 Drawing Sheets

(51) Int. Cl.
    *H04B 1/711*     (2011.01)
    *H04B 1/7097*     (2011.01)

(58) Field of Classification Search
    USPC ................ 342/357.59, 357.61; 375/142–143
    See application file for complete search history.

(56) References Cited

U.S. PATENT DOCUMENTS

| | | | |
|---|---|---|---|
| 7,994,975 B2 * | 8/2011 | Abraham | G01S 19/21 342/357.59 |
| 8,391,340 B2 * | 3/2013 | Weill | G01S 19/37 342/189 |
| 9,236,903 B2 * | 1/2016 | Mattos | H04B 1/7103 |
| 9,362,964 B2 * | 6/2016 | Shen | H04B 1/1027 |
| 2003/0072356 A1 * | 4/2003 | Abraham | G01S 1/045 375/148 |
| 2004/0017867 A1 * | 1/2004 | Thomas | H04B 1/7103 375/346 |
| 2004/0184516 A1 * | 9/2004 | Kohli | G01C 21/26 375/150 |
| 2012/0001798 A1 | 1/2012 | Goldberg | |
| 2012/0050103 A1 * | 3/2012 | Revol | G01S 19/21 342/357.68 |
| 2015/0117500 A1 * | 4/2015 | Revol | H04B 1/71 375/150 |
| 2015/0117501 A1 * | 4/2015 | Revol | H04B 1/71 375/150 |

\* cited by examiner

METHOD OF DETECTING INTERFERENCE IN A SATELLITE RADIO-NAVIGATION SIGNAL

FIELD OF THE INVENTION

The present invention relates to the field of satellite radio-navigation systems and more precisely to satellite radio-navigation signals receivers.

The invention pertains to a method of detecting interference in a satellite radio-navigation signal received by such a receiver.

BACKGROUND OF THE INVENTION

When the radio-navigation signal is superimposed on a narrow-band interfering signal, this has the effect of engendering measurement errors which impact the time and position calculations performed by the receiver and ultimately give rise to a positioning error.

It is therefore important to be able to detect the presence of interference in the radio-navigation signal received so as to be able to undertake corrective processing or to exclude the measurements performed in the presence of interference.

The known solutions to the aforementioned problem are based on the detection of an aberrant measurement with respect to an expected average or deviation.

These solutions exhibit the drawback of requiring too great a detection time between the instant at which the interference occurs and the instant at which it is actually detected.

The invention proposes a scheme for detecting interference based on the measurement of the phase dispersion between two correlation measurements carried out for two consecutive time offsets.

The invention can be executed by a satellite-based positioning receiver during the radio-navigation signal tracking phase.

SUMMARY OF THE INVENTION

The subject of the invention is a method of detecting interference in a satellite radio-navigation signal, characterized in that it comprises the following steps:

determining a first temporal position for which the correlation between the said signal and a local spreading code, offset by the said position, is maximum;

determining a plurality of measurements of correlation between the said signal and a local spreading code offset by a plurality of secondary temporal positions, the said plurality of secondary temporal positions and the said first temporal position being regularly spaced;

determining, for a plurality of different correlation measurement pairs formed by two measurements at two consecutive temporal positions, the phase difference between the two correlation measurements of the said pair;

calculating an item of information representative of the standard deviation of the said phase difference; and comparing the said item of information with a detection threshold configured at least as a function of the ratio of the powers of the signal and of the interference.

According to a particular aspect of the invention, the said item of information is equal to the absolute value of the ratio between the mean of the said phase difference and the standard deviation of the said phase difference.

According to a particular aspect of the invention, the said correlation measurements are compensated for the expected value of the correlation in the absence of interference.

The subject of the invention is also a device for receiving satellite radio-navigation signals comprising means configured to implement the method of detecting interference according to the invention.

BRIEF DESCRIPTION OF THE DRAWINGS

Other characteristics and advantages of the present invention will be more apparent on reading the description which follows in relation to the appended drawings which represent.

MORE DETAILED DESCRIPTION

Figure 1:
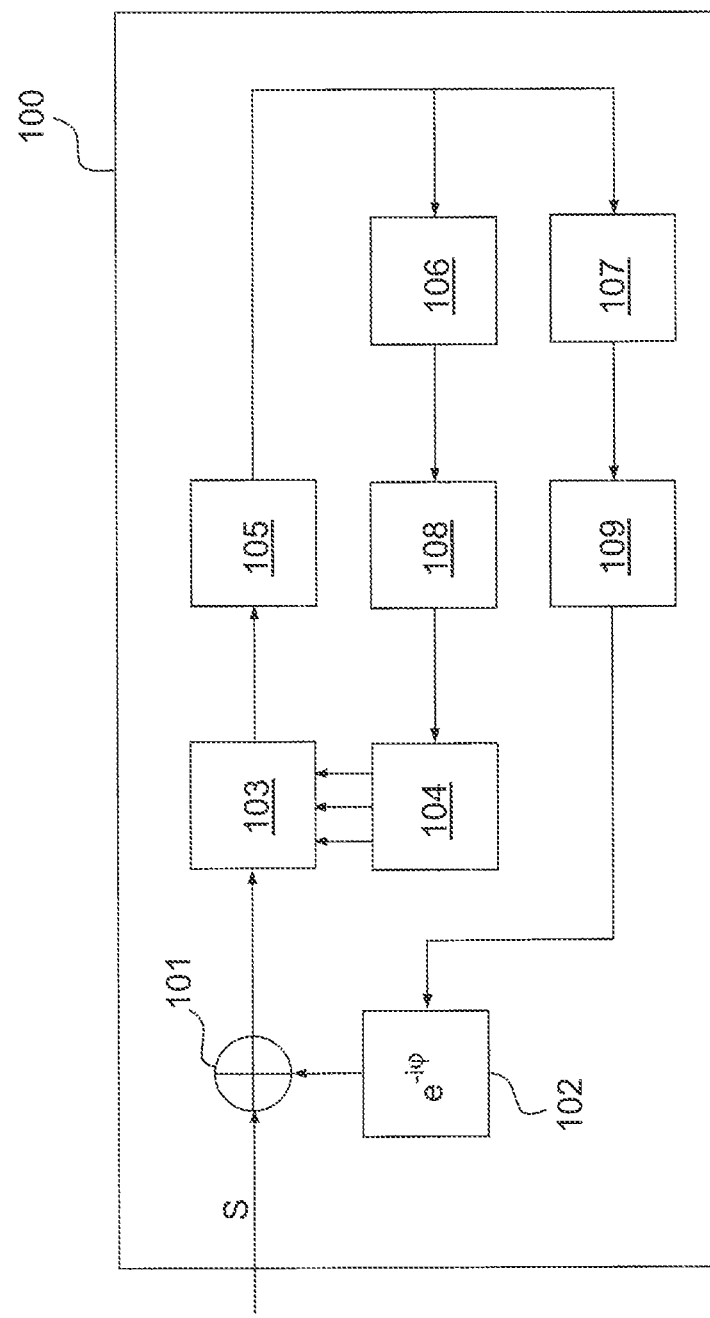
FIG. 1, a schematic of a radio-navigation signals reception device adapted for implementing the method according to the invention.

FIG. 1 represents a schematic of a radio-navigation signals reception device adapted for implementing the method according to the invention.

Such a device 100 is based on a standard radio-navigation signals receiver which comprises notably the following functionalities. The received signal S is demodulated in phase by way of a demodulator 101 and of a local carrier 102. The demodulated signal S is thereafter transmitted to a correlator 103 so as to perform a correlation of the signal S with a locally generated spreading code 104. Advantageously, several correlations are carried out by applying different delays to the signal received on each occasion. Typically, three correlations can be carried out, one at a given temporal instant, one advanced relative to this instant and the last delayed relative to this same instant, the advance and delay offsets being of smaller duration than the duration of a chip of the spreading code.

According to the invention, several additional correlations can be carried out, with equidistributed configurable delays.

The result of these additional correlations is provided to a module 105 for detecting interference according to the invention which executes a method described further on in the text.

The device 100 also comprises a code discriminator 106 and a digital control operator NCO 108 for steering the generation of the local code, in particular the temporal instant at which the main correlation is carried out.

The device 100 can also comprise a phase discriminator 107 and a digital control operator NCO 109 for steering the generation of the local carrier 102, stated otherwise the value of the phase shift to be imparted to the received signal S.

The device 100 according to the invention can comprise any other functionality customarily implemented in a satellite radio-navigation signals receiver. The elements described in FIG. 1 can also be replaced with any other equivalent function.

Figure 2:
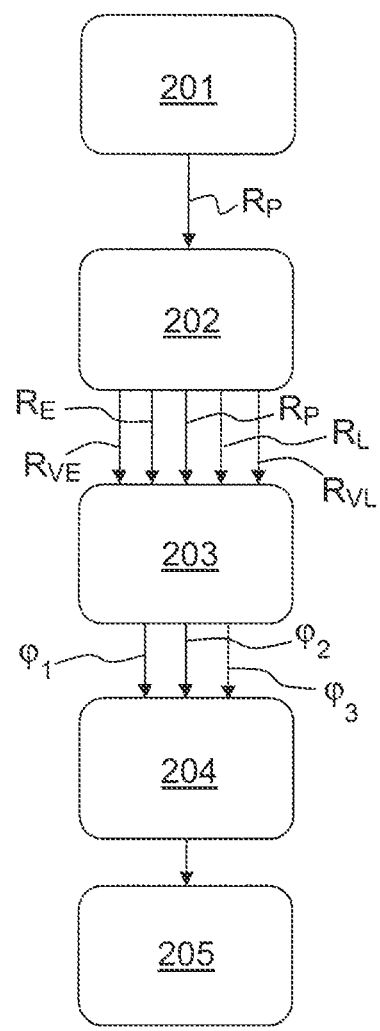
FIG. 2, a flowchart describing the steps for implementing the method of detecting interference according to the invention.

The method according to the invention comprises, as illustrated in the flowchart of FIG. 2, principally five steps.

In a first step 201, the maximum $R_P$ of the correlation function between the locally generated spreading code and the received signal offset temporally by a configurable delay is determined on the basis of the correlation results provided by the module 103. The temporal position associated with this correlation maximum which corresponds, in the absence of interference, to the instant at which the signal received and the spreading code are correctly synchronized, stated otherwise are in phase, is retained. This first step 201 of the method according to the invention is implemented by a radio-navigation signals receiver according to the prior art with the aim of determining a positioning item of information.

In a second step 202, several additional correlation measurements $R_{VL}$, $R_L$, $R_E$, $R_{VE}$ are determined. Each measurement is obtained by offsetting the received signal by a parametrizable positive or negative delay. The set of temporal positions at which the various correlation measurements are performed, including the measurement of the correlation maximum $R_P$, are equidistributed. Stated otherwise, the duration between two consecutive temporal positions of correlation is substantially constant.

According to a variant embodiment of the invention, each correlation measurement is compensated by the expected theoretical value of the correlation in the absence of interference. Stated otherwise this value is subtracted from the measurement. This operation makes it possible to remove from the correlation measurement the contribution of the useful signal and thus preserve only the contribution of the noise and interference. The expected theoretical value of the correlation can be calculated by an estimation of the power of the useful signal itself obtained on the basis of an item of information on the operating signal-to-noise ratio of the receiver and of a measurement of the noise power provided by means external to the invention.

In a third step 203, the phase difference between two correlation measurements is determined at two consecutive temporal positions. In the absence of interference, this phase difference is random. On the other hand, in the presence of a narrow-band interfering signal, this phase difference is substantially constant since the phase of the interfering signal follows an evolution which is linear with the delay applied to the correlation. Moreover the correlation of the signal received with the local spreading code does not modify this evolution.

In a fourth step 204, an item of information representative of the standard deviation of the phase difference defined in step 203 is determined. In the presence of interference, this standard deviation is low since the phase of the interfering signal evolves linearly with the delay. On the other hand, in the absence of interference, this standard deviation is high since the phase follows a random distribution.

On the basis of this remark, it is possible to construct an interference detection criterion based on comparing the standard deviation, or a function of the standard deviation, with a detection threshold.

The detection criterion used can be equal to the absolute value of the ratio of the mean of the phase differences calculated in step 203 to their standard deviation. Other equivalent criteria may be used, for example the inverse of the standard deviation or a multiple of this inverse.

The mean M and the standard deviation $\Omega$ can be calculated with the aid of the following relations, where the sign * designates the complex conjugate operator:

$$M = \frac{\sum_{k=0}^{K}(\arg(R_{VE}(kT) \cdot R_{VVE}(kT)^*) + \ldots + (\arg(R_P(kT) \cdot R_E(kT)^*) + \ldots + (\arg(R_{VVL}(kT) \cdot R_{VL}(kT)^*)}{K}$$

$$\Omega = \sqrt{\frac{\sum_{k=0}^{K}|(\arg(R_{VE}(kT) \cdot R_{VVE}(kT)^*) \ldots + (\arg(R_P(kT) \cdot R_E(kT)^*) \ldots + (\arg(R_{VVL}(kT) \cdot R_{VL}(kT)^*) - M|^2}{K}}$$

The interference indicator used may be equal to $$\gamma = \left|\frac{M}{\Omega}\right|.$$

In a fifth step 205, the indicator $\gamma$ is compared with an interference detection threshold $S_{DET}$ configured as a function of the ratio of the powers of the useful signal to the interfering signal. If the indicator $\gamma$ is greater than the detection threshold $S_{DET}$ then this signifies that the standard deviation $\Omega$ is low and the presence of interference is concluded.

In the various alternative embodiments of the device 100 according to the invention, the calculation modules can be arranged according to various architectures, in particular each step of the method according to the invention can be implemented by a distinct module or on the contrary the two steps can be grouped together within a single calculation module.

Each of the calculation modules constituting the device according to the invention can be embodied in software and/or hardware form. Each module can notably consist of a processor and a memory. The processor can be a generic processor, a specific processor, an Application Specific Integrated Circuit (ASIC) or a Field-Programmable Gate Array (FPGA).

The invention claimed is:

1. A method, implemented by a radio-navigation signals receiver comprising a correlator and an interference detector, for detecting interference in a satellite radio-navigation signal, comprising the steps of:
   calculating, by the correlator, a first temporal position for which a correlation between a local spreading code and the radio-navigation signal, offset by the said position, is maximum;
   calculating, by the correlator, a plurality of measurements of a correlation between the local spreading code and the radio-navigation signal shifted by a plurality of secondary temporal positions, the plurality of secondary temporal positions and the first temporal position being regularly spaced;
   calculating, by the interference detector, for a plurality of different correlation measurement pairs formed by two correlation measurements at two consecutive temporal positions, a phase difference between the two correlation measurements of the pair;

calculating, by the interference detector, an item of information representative of a standard deviation of the phase difference;

comparing, by the interference detector, the item of information with a detection threshold configured at least as a function of a ratio of a power of the radio-navigation signal and a power of the interference; and producing, by the interference detector, from the comparison, an information on the presence or absence of interference of the received satellite radio-navigation signal.

2. The method of claim 1, in which the item of information is equal to an absolute value of a ratio of a mean of the phase difference and a standard deviation of the phase difference.

3. The method of claim 1, further comprising compensating the correlation measurements for an expected value of the correlation in the absence of interference.

4. The method of claim 1, further comprising receiving, at the radio-navigation signals receiver, the satellite radio-navigation signal.

5. The method of claim 1, further comprising performing corrective processing to the satellite radio navigation signal when the presence of interference in the received satellite radio-navigation signal is detected.

6. The method of claim 1, further comprising excluding a measurement performed on the received satellite radio-navigation signal when the presence of interference in the received satellite radio-navigation signal is detected.

7. A device for receiving satellite radio-navigation signals comprising:

a correlator configured to calculate a first temporal position for which a correlation between a local spreading code and the radio-navigation signals, shifted by the first temporal position, is maximum and to calculate a plurality of measurements of a correlation between the local spreading code and the radio-navigation signals shifted by a plurality of secondary temporal positions, the plurality of secondary temporal positions and the first temporal position being regularly spaced; and an interference detector configured to calculate, for a plurality of different correlation measurement pairs formed by two correlation measurements at two consecutive temporal positions, a phase difference between the two correlation measurements of the pair, the interference detector being further configured to calculate an item of information representative of a standard deviation of the phase difference and to compare the item of information with a detection threshold configured at least as a function of a ratio of a power of the signal and of a power of the interference to thereby produce an indication of a presence or absence of interference in the received radio-navigation signal.

8. The device of claim 7, in which the item of information is equal to an absolute value of a ratio between a mean of the phase difference and a standard deviation of the phase difference.

9. The device of claim 7, wherein the correlator is further configured to compensate the correlation measurements for an expected value of the correlation in the absence of interference.

10. The device of claim 7 wherein the interference detector is configured to undertake corrective processing to the satellite radio navigation signal when a presence of interference in the received satellite radio-navigation signal is detected.

11. The device of claim 7 wherein the interference detector is further configured to exclude a measurement performed on the received satellite radio-navigation signal when the indication of a presence or absence of interference in the received radio-navigation signal indicates the presence of interference in the received satellite radio-navigation signal.

* * * * *